(12) United States Patent
Gallagher et al.

(10) Patent No.: US 6,216,633 B1
(45) Date of Patent: Apr. 17, 2001

(54) BRISKET RAIL ASSEMBLIES AND METHODS

(75) Inventors: Jeffrey C. Gallagher, Sedro Woolley; Scott Pawlowicz, Burlington, both of WA (US)

(73) Assignee: Blue Diamond Manufacturing Co., Mt. Vernon, WA (US)

( * ) Notice: Subject to any disclaimer, the term of this patent is extended or adjusted under 35 U.S.C. 154(b) by 0 days.

(21) Appl. No.: 09/252,550

(22) Filed: Feb. 19, 1999

Related U.S. Application Data

(60) Provisional application No. 60/075,212, filed on Feb. 19, 1998.

(51) Int. Cl.[7] ............................................... A01K 1/12
(52) U.S. Cl. ..................... 119/14.03; 119/520; 119/756; 119/757
(58) Field of Search ............................ 119/14.02, 14.03, 119/520, 756, 738, 757

(56) References Cited

U.S. PATENT DOCUMENTS

| | | | |
|---|---|---|---|
| 3,885,528 | * 5/1975 | Vandenberg | 119/14.03 |
| 4,194,467 | * 3/1980 | Nielsen et al. | 119/14.03 |
| 4,419,961 | * 12/1983 | Vandenberg et al. | 119/14.03 |
| 4,951,608 | 8/1990 | Reisgies et al. . | |
| 5,259,334 | * 11/1993 | Peacock | 119/14.03 |
| 5,259,335 | * 11/1993 | Moreau | 119/14.03 |
| 5,638,768 | * 6/1997 | Moreau | 119/14.03 |
| 5,803,015 | * 9/1998 | Rhodes et al. | 119/14.02 |
| 6,026,766 | * 2/2000 | Albers, Jr. | 119/520 |

* cited by examiner

*Primary Examiner*—Charles T. Jordan
*Assistant Examiner*—Yvonne R. Abbott
(74) *Attorney, Agent, or Firm*—Michael R. Schacht; Hughes & Schacht, PLLC

(57) ABSTRACT

A milking parlor assembly including a brisket rail therefor. The brisket rail is formed of sheets of steel that are bent into six-sided segments that are relatively easy to manufacture and, when assembled into the brisket rail, very easy to clean and maintain.

20 Claims, 5 Drawing Sheets

BRISKET RAIL ASSEMBLIES AND METHODS

RELATED APPLICATIONS

This application claims priority of U.S. Provisional Application No. 60/075,212 filed Feb. 19, 1998.

TECHNICAL FIELD

The present invention relates to milking parlor systems and, more specifically, to milking parlor systems having brisket rails that are adapted to maintain dairy cows in a herringbone pattern within a milking area during milking.

BACKGROUND OF THE INVENTION

Systems and methods for milking cows comprise a milking machine system and a milking parlor system. The milking machine system milks the cows and conveys the milk to a storage tank for further processing, packaging, and the like. The present invention does not relate to milking machine systems and may be used with any conventional milking machine system of appropriate size and capacity.

A primary function of the milking parlor system is physically to arrange and restrain the cows within a milking area during the milking process. The present invention is of particular advantage when applied to milking parlors that are designed to arrange cows in what is referred to as a "herringbone" arrangement during milking. When in a herringbone arrangement, cows are arranged at a slight angle within the milking area such that the head of a middle cow is slightly in front of the head of the cow to one side and slightly behind the head of the cow to the other side.

Secondary functions of the milking parlor system are to allow the cows to be led into and released from the milking area prior to and after milking in a quick and orderly manner.

Beyond these basic functions, a milking parlor system must operate reliably several times a day, seven days a week, for many years. Such a system must also be easy to clean and withstand the effects of repeated washings. Because cows are large and heavy, the milking parlor system must be sufficiently rigid and durable to withstand the force of the cows thereon. And like all products that are sold in a competitive environment, the costs of producing milking parlor systems must be kept as low as possible.

The need thus exists for improved milking parlors that effectively maintain cows in a herringbone arrangement, that may be used in a system that facilitates ingress and egress of cows, that are rigid, durable, and reliable, that are easy to clean, and that may be manufactured efficiently and inexpensively.

PRIOR ART

The Assignee of the present invention has long manufactured a herringbone-style milking parlor system having a structural system, a brisket rail, and a rump rail. The structural system maintains the rump rail at a fixed location and allows the brisket rail to be moved up and down as well as towards and away from the rump rail.

The movement of the brisket rail relative to the rump rail allows the milking parlor system to be placed in one of three configurations. In a first configuration, the brisket rail is lowered and retracted away from the rump rail. Cows are introduced into the milking area, usually in a serial arrangement, when the system is in this first configuration. In a second configuration, the brisket rail is lowered and extended towards the rump rail. Cows are milked in this second configuration. In a third configuration, the brisket rail is retracted and raised. In this third configuration, a number of cows are allowed to leave the milking area at the same time.

The brisket rail employed by the Assignee's prior art milking parlor system is an assembly of a plurality of horizontal metal tubes that are bent into a zigzag shape and welded together with vertical support bars. The zigzag shape allows the brisket rail to extend partly around the cow's brisket in a manner that holds the cow against the rump rail and against the cow on one side. The cows are thus securely maintained in the herringbone configuration during milking. This brisket bar will be referred to as a tube-style brisket bar because of the horizontal metal tubes that are bent to form the zigzag shape described above.

The drawbacks of the tube-style brisket bar include relatively high manufacturing costs and the fact that its relatively complex shapes somewhat complicates the process of cleaning the brisket bar.

The Applicant is also aware of U.S. Pat. No. 4,951,608 to Reisgies et al. This patent discloses a milking parlor system having a large, hollow brisket bar that is generally triangular in cross-section. This brisket bar is arranged such that it defines a generally vertical back wall, a downwardly slanted upper front wall, and an upwardly slanted lower front wall. The front walls are formed from a first rectangular piece of sheet metal that extends the length of the brisket rail and is cold formed to form two legs of the triangular cross-section of the brisket rail. The rear wall is formed by a second rectangular piece of sheet metal that extends the length of the brisket rail and which is welded to the first piece of sheet metal.

Importantly, the brisket bar described in the Reisgies et al. patent does not have a zigzag shape and thus does not function as well as the Assignee's tube-style brisket bar at maintaining cows in a proper herringbone arrangement.

OBJECTS OF THE INVENTION

From the foregoing, it should be apparent that a primary object of the present invention is to provide improved milking parlor systems and methods.

Another more specific object of the present invention is to provide brisket rails for milking parlor system having a favorable mix of the following characteristics:

optimized for maintaining cows in a herringbone configuration;

rigid and sturdy for reliable, long-term use;

can be cleaned easily and thoroughly; and can be manufactured easily and inexpensively.

SUMMARY OF THE INVENTION

The present invention is a milking parlor system having a brisket bar formed of a plurality of discrete segments joined together at angles in a repeated pattern. The pattern formed by the discrete segments yields a brisket bar that defines brisket areas that receive the fronts of the cows as they are being milked and maintain the cows in a herringbone configuration.

Each discrete segment is formed by a single flat sheet of material, preferably stainless steel, that is bent into a hollow body and welded along a back seam. The ends of adjacent segments are then welded to each other to form the brisket rail. The brisket rail is thus an elongate, hollow body formed of welded together discrete segments.

In the preferred embodiment of the invention, the segments are of two types that will be referred to as long segments and short segments. As their names suggest, the long segments have a length dimension that is longer than a similar length dimension of the short segments. The ends of the long and short segments are formed at complimentary angles such that, overall, the brisket rail extends along a straight line, although each individual segment extends at an angle to this straight line. The exact angles at which the ends of the segments are formed are not critical so long as these angles are complimentary as just described.

A brisket rail as just described is well-suited to maintaining cows in the required herringbone pattern, can be manufactured simply and relatively inexpensively, is rigid, durable, and reliable, and can be cleaned quickly and easily.

DETAILED DESCRIPTION OF THE INVENTION

Figure 1:
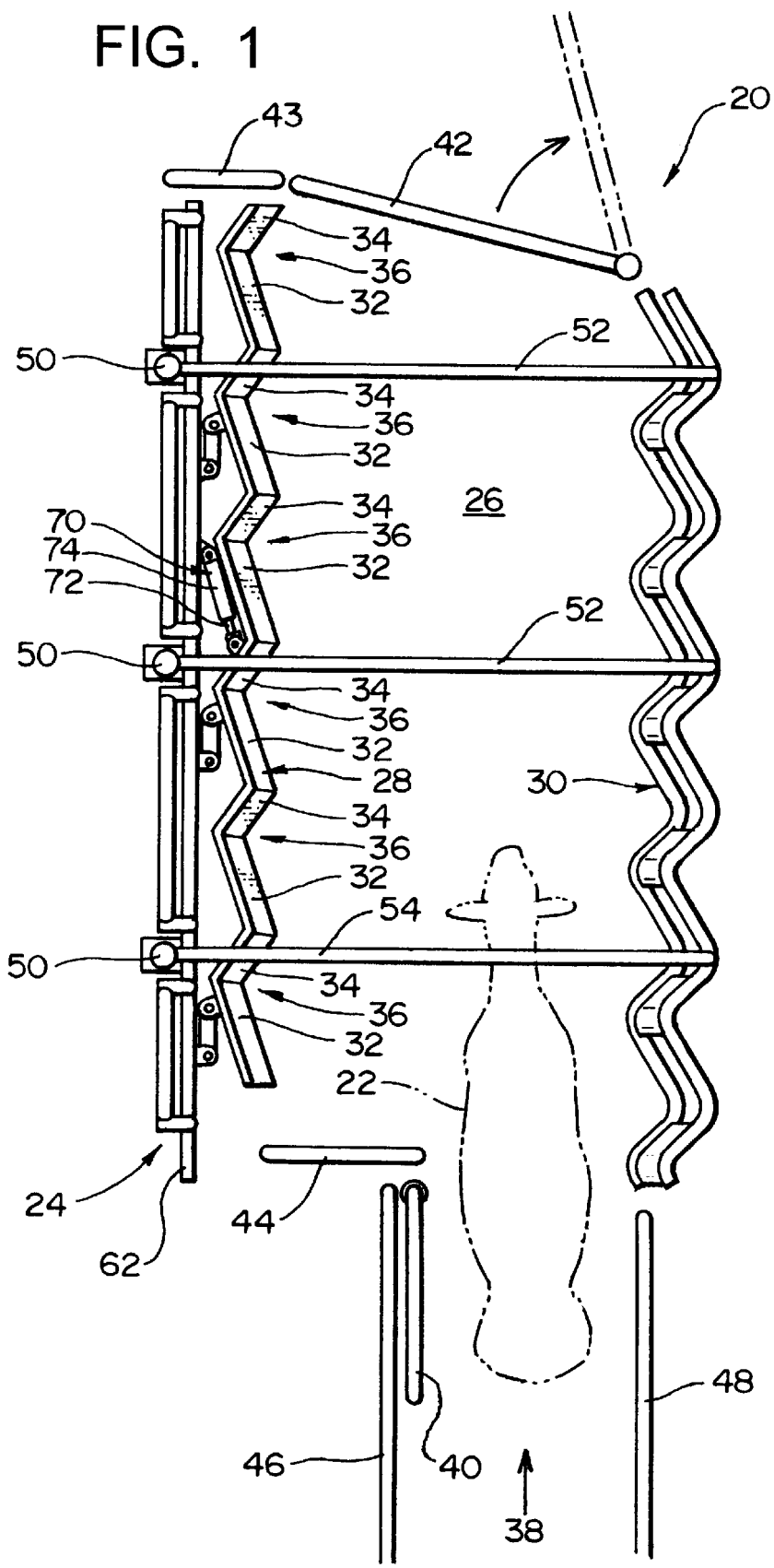
FIG. 1 is a top plan view of a portion of a milking parlor system incorporating a brisket rail constructed in accordance to the teachings of the present invention, the milking parlor system being depicted in a first configuration.

Referring initially to FIG. 1, depicted therein is a milking parlor system 20 constructed in accordance with, and embodying, the principles of the present invention. The system 20 is designed to allow a plurality of cows 22 to be milked simultaneously in a herringbone arrangement using automatic milking machines (not shown).

In the following discussion, the milking parlor system 20 will first be generally discussed, after which a more detailed discussion of the system 20 will be presented.

The system 20 is supported by a structural system 24 that generally defines the boundaries of a milking area 26 in which the cows 22 are located during milking. Attached to the structural system 24 is a brisket rail 28 and a rump rail 30.

When the cows 22 are being milked, the brisket rail 28 engages the front, or brisket, of the cows 22, while the rump rail 30 engages the rear, or rump, of the cows 22. The brisket rail 28 engages the front of the cow 20 to hold the rear of the cow against the rump rail 30. The rump rail 30 is located relative to the milking area 26 to arrange the rear of the cow 22 where convenient for use of an automatic milking machine. The combination of the brisket rail 28 and the rump rail 30 thus maintain a plurality of cows 22 in a properly spaced arrangement within the milking area 26.

In addition, the brisket rail 28 is movably mounted on the structural system 24 so that movement of the brisket rail 28 can place the milking parlor system 20 into one of three configurations. In a first configuration shown in FIGS. 1 and 4, the cows 22 are introduced into the milking area 26 and can be moved around within this area 26. In a second configuration shown in FIGS. 2 and 3, the brisket rail 28 is moved forward such that the rear ends of the cows 22 are held against the rump rail 30. In a third configuration shown in FIG. 5, the brisket rail 28 is raised above top of the cows 22 so that the entire group of cows 22 being milked can leave the milking area 26 at the same time.

The brisket rail 28 is comprised of a plurality of long outward segments 32 and a plurality of short inward segments 34. Each of these segments 32 and 34 is manufactured from a single sheet of flat steel that is bent along a number of fold lines. Ends of the segments 32 and 34 are then welded together to form the entire brisket rail 28, with the segments 32 and 34 being alternated along the length of the rail 28. From the top, the brisket rail 28 thus takes on a zigzag shape that defines brisket areas 36 that receive the fronts of the cows 22 and which helps to maintain the cows 22 in their herringbone pattern.

The brisket rail 28 described above thus obtains the following benefits: (a) it allows the milking parlor system 20 to be placed in three configurations, including one that allows the entire group of cows 22 to leave at once; (b) it ensures that the cows maintain their herringbone orientation during use; (c) it is rigid and thus rugged during use; (d) it is easy to clean and maintain.

The milking parlor system 20 will now be described in further detail. In this application, the terms "front" and "back" refer to the directions to the left and right, respectively, in FIGS. 1–5. The terms "up" and "down" refer to the top and bottom, respectively, in FIGS. 3–5.

As shown in FIG. 1, the parlor system 20 comprises an entryway 38 through which the cows 22 enter the milking area 26. A gate 40 is arranged to selectively open or close the entryway 38. The end of the milking area 26 opposite the entryway 38 is closed by a distal gate member 42. The distal gate member 42 is set at an angle that corresponds to the angle of the herringbone pattern formed by the cows 22 but can be opened as shown by broken lines in FIG. 1. When closed, the distal gate member and a distal fence member 43 close off the milking area 26. A proximal fence member 44 is arranged to close a gap between the entryway 38 and the brisket rail 28. The entryway 38 is defined by first and second entryway fence members 46 and 48.

As discussed above, the parlor system 20 is in its first configuration in FIG. 1. In this first configuration, a series of cows 22 are led into the milking area 26 such that the first cow engages the distal fence member 42. At this point, the first cow 22 is turned such that the front thereof is received within the brisket area 26 closest to the distal fence member 36. The subsequent cows 22 in the series are turned by the cow 22 ahead in the line until all of the cows are arranged in an angled, side-to-side arrangement referred to as a herringbone pattern.

Figure 2:
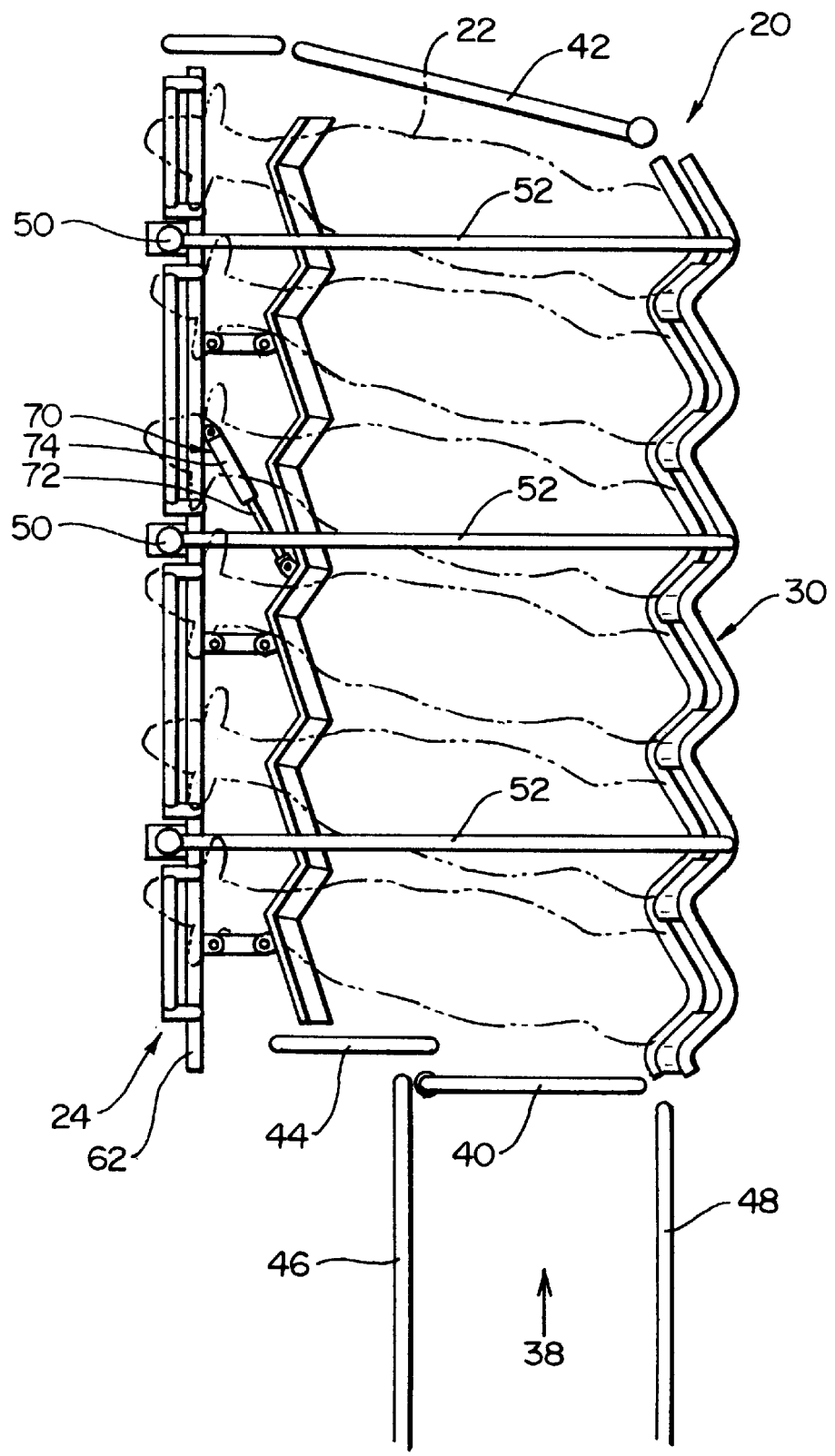
FIG. 2 is a top plan view of the portion of the milking parlor system shown in FIG. 1, the milking parlor system being depicted in a second configuration.

At this point, the brisket rail 28 is moved towards the back of the milking area 26 such that the milking parlor system 20 is in its second configuration. FIG. 2 depicts the location of the brisket rail 28 in this second configuration. FIG. 2 illustrates that the exemplary milking parlor system 20 is designed to accommodate six cows 22 at one time, although a parlor system of the present invention can be designed to accommodate more or less than six cows.

As the brisket rail 28 moves back, it engages the front ends of the cows 22 and forces them back so that their rear ends are held against the rump rail 30. At this point, the cows 22 are snugly held between each other and the brisket and rump rails 28 and 30 such that the automatic milking machine can be easily attached thereto.

The structural system 24 comprises a series of posts 50 and overhead arms 52 and a brisket rail support assembly 54. The posts 50 are rigidly connected to a floor 56 of the parlor area 26 such that the posts 50 extend substantially vertically from the floor 56.

The overhead arms 52 extend generally horizontally from upper ends of the posts 50 out over the parlor area 26. More specifically, the overhead arms 52 comprise a horizontal portion 52a and a downwardly extending distal portion 52b to which the rump rail 30 is rigidly connected. A brace member 58 extends between the horizontal portion 52a and the distal portion 52b. A flange 52c welded to the horizontal portion 52a rigidifies this portion 52a.

The brisket rail support assembly 54 is mounted onto the posts 50 such that the support assembly 54 moves the brisket rail 28 up and down. In particular, the support assembly 54 comprises a plurality of bearing assemblies 60, a support rail 62, a plurality of swing arms 64, a plurality of neck rails 66, a plurality of lift assemblies 68, and an actuator assembly 70.

Figure 3:
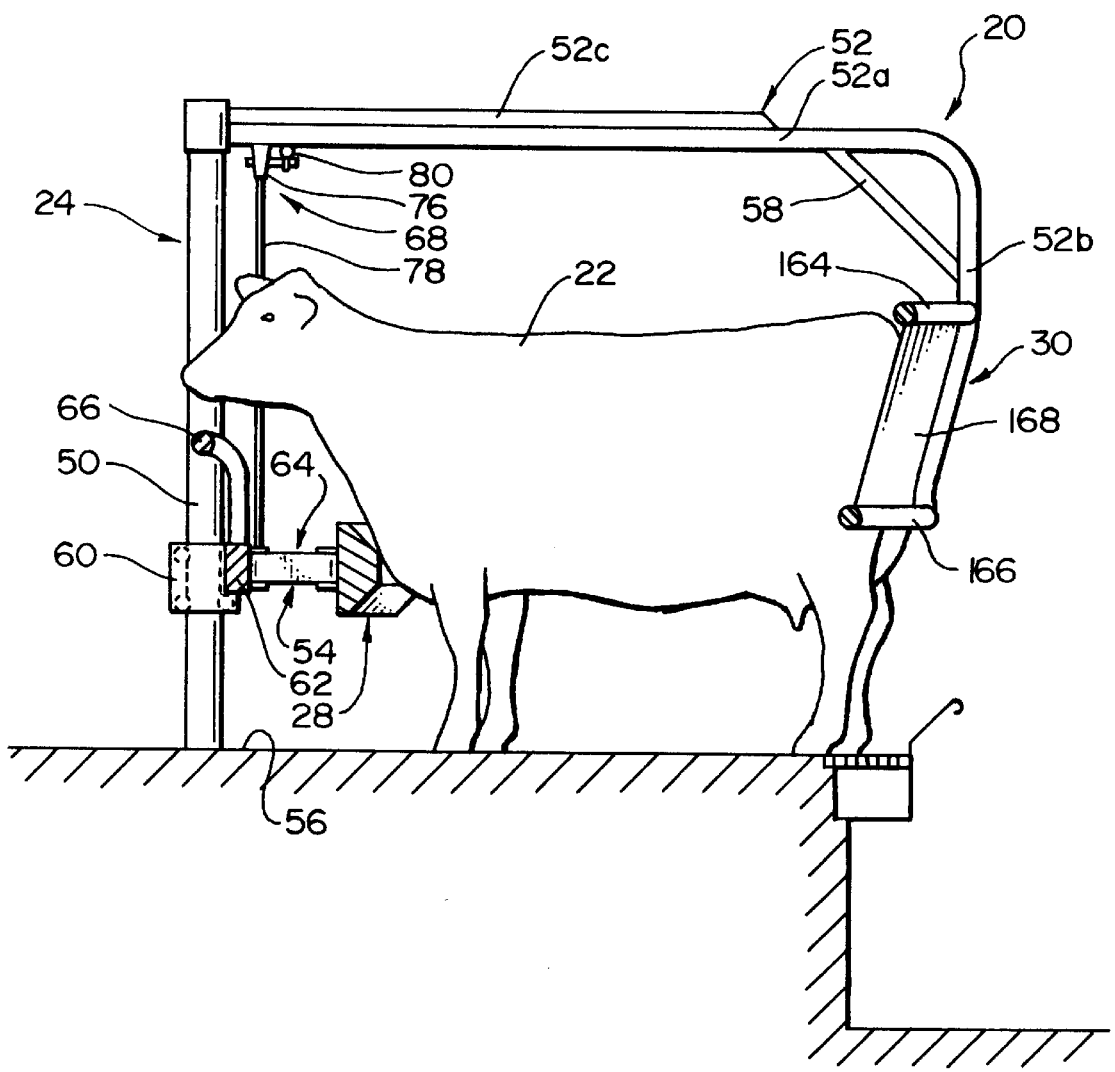
FIG. 3 is a side, elevational, cut-away view illustrating the milking parlor system in its second configuration.
Figure 4:
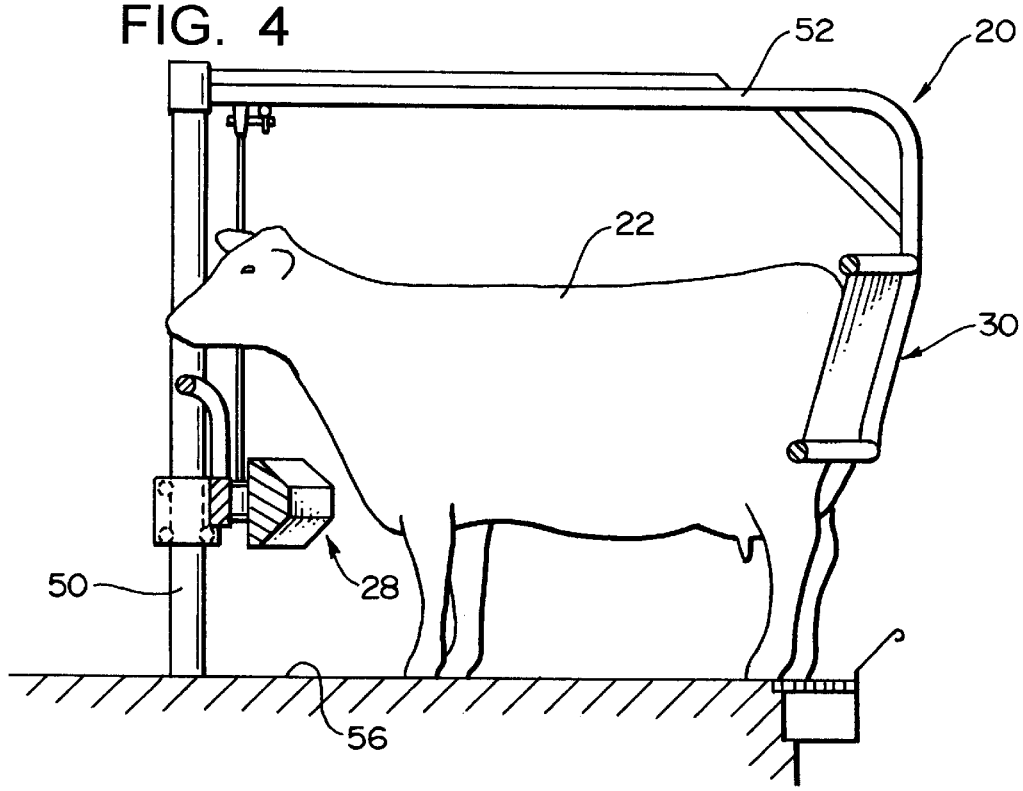
FIG. 4 is a side, elevational, cut-away view depicting the milking parlor system of FIG. 1 in its first configuration.

The swing arms 64 are rotatably connected to the support rail 62 and the brisket rail 28. The swing arms 64 thus connect the brisket rail 28 to the support rail 62 such that the brisket rail 28 may swing between a forward position (FIGS. 1, 4, and 5) and a rearward position (FIGS. 2 and 3). The actuator assembly 70 comprises a piston member 72 and a cylinder member 74 and is connected between the support rail 62 and the brisket rail 28; the effective length of the actuator assembly 70 may be changed by causing the piston member 72 to move relative to the cylinder member 74, thereby swinging the brisket rail 28 between its forward and rearward positions.

Figure 5:
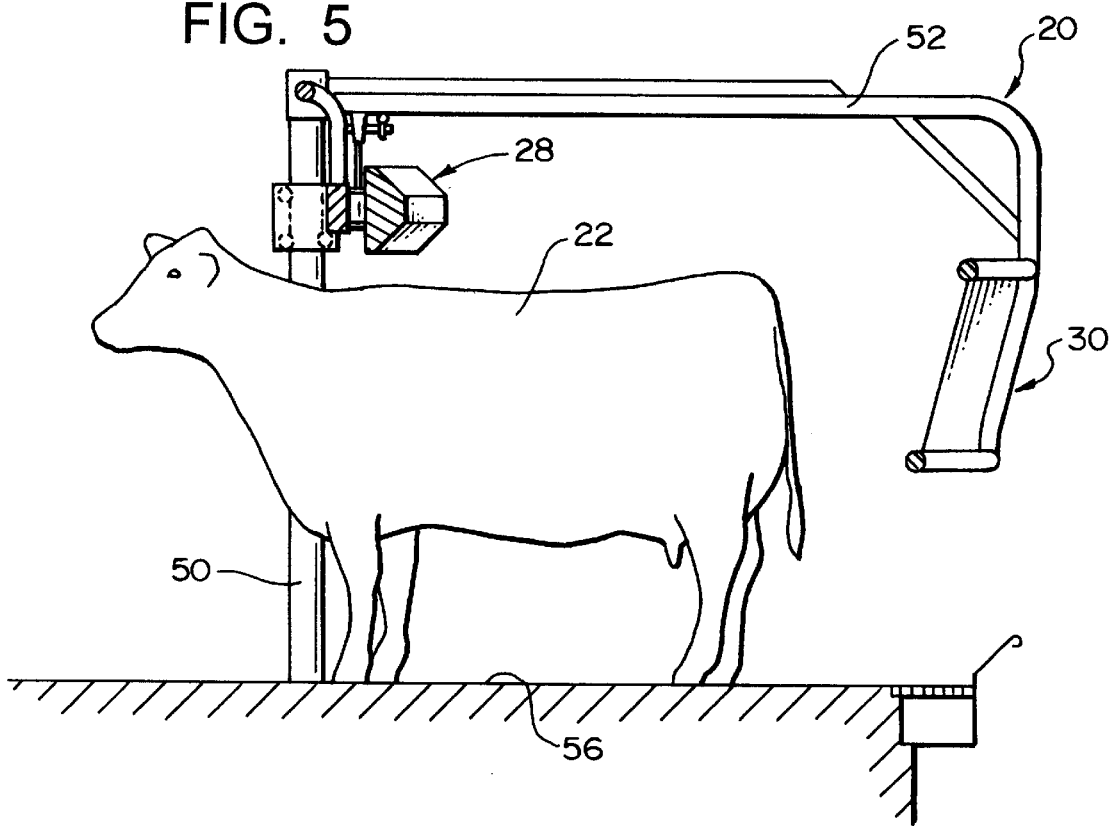
FIG. 5 is a side, elevational, cut-away view depicting the milking parlor system of FIG. 1 in a third configuration.

The bearing assemblies 60 attach the support rail 62 to the posts 50 such that the support rail 62 can move up and down along the posts 50 in a generally horizontal arrangement. The lift assemblies 68 are connected between the overhead arms 52 and the support rail 62. Each lift assembly 68 comprises a lift cylinder 76 lift cable 78, and lift linkage 80. The effective lengths of the lift assemblies 68 can be increased or decreased by actuating the lift cylinders 76, which in turn engage the lift linkages 80, which in turn engage and displace the lift cable 78 along its axis. Increasing and decreasing the effective lengths of the lift assemblies 68 in synchrony lowers and raises the support rail 62. The lift assemblies 68 allow the support rail, and thus the brisket rail, be moved between a lower position (FIG. 4) and an upper position (FIG. 5).

By appropriately operating the lifting assemblies 68 and the actuator assembly 70, the brisket rail 28 may be moved to place the milking parlor assembly 20 into its first, second, and third configurations described above.

Figure 6:
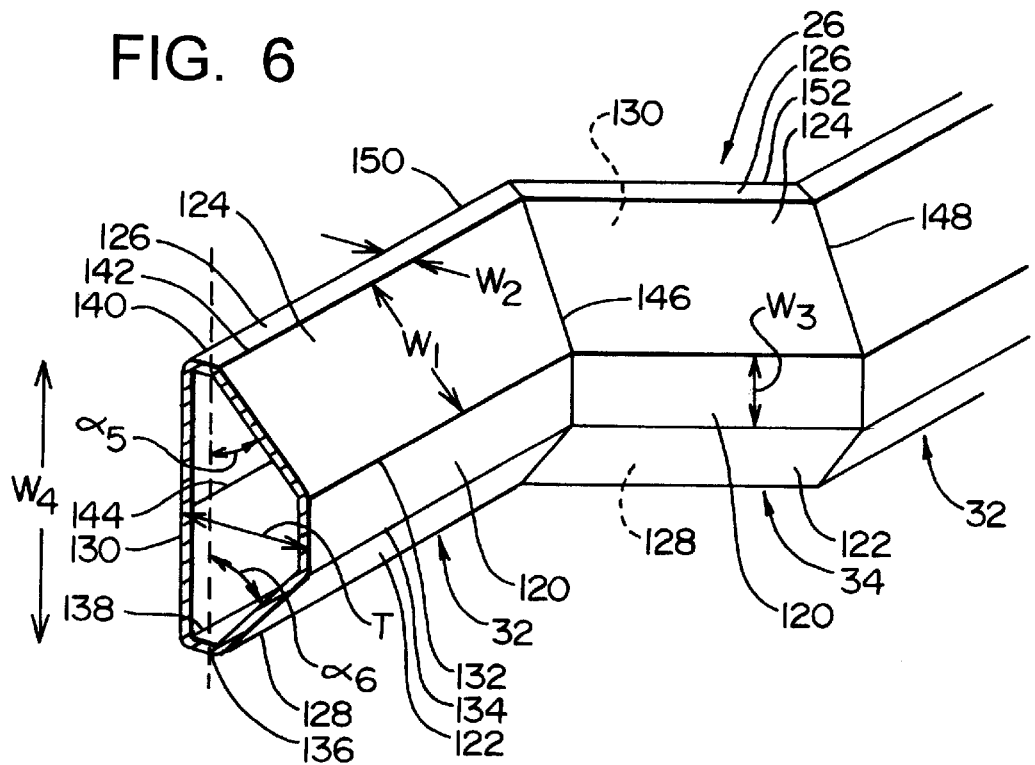
FIG. 6 is a partial perspective view depicting the details of construction of the brisket rail of the present invention.

Referring now to FIG. 6, the construction of the brisket rail 28 will be described in further detail. As shown in FIG. 6, the brisket rail 28 is comprised of a plurality of short segments 32 and 34. These segments share some common features but differ in length and the manner in which their ends are formed.

Referring initially to the features common to these segments 32 and 34, FIG. 6 shows that each of these segments 32 and 34 comprises a front surface 120, first and second slanted surfaces 122 and 124, an upper surface 126, a lower surface 128, and a rear surface 130. These surfaces 120–130 are defined by first through sixth bend lines 132–142.

The segments 32 and 34 are formed from flat sheets of steel that are bent along the bend lines 132–142 and welded along a back seam 144 to form a hollow body having two open ends. The open ends are welded at seams 146 and 148 into an elongate, hollow body that forms the brisket rail 28.

Figure 7:
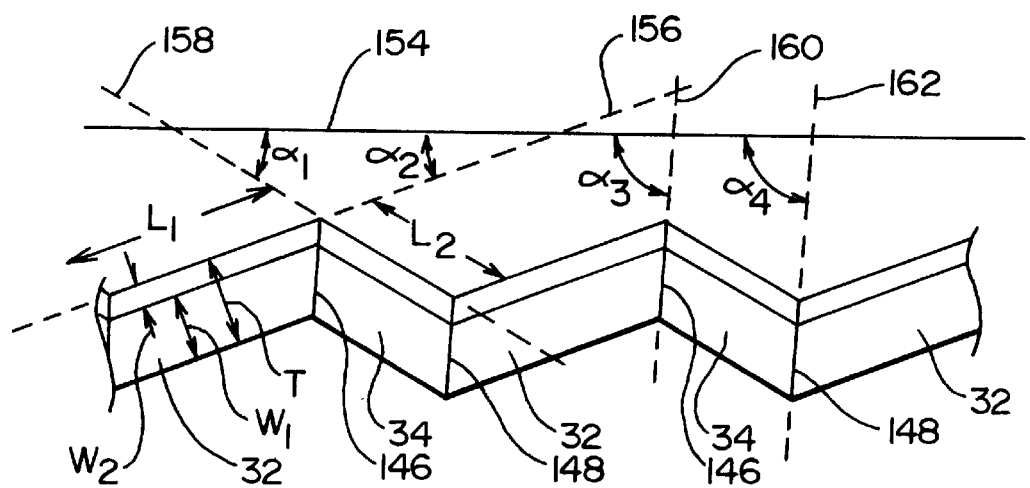
FIG. 7 is a top, plan view of a portion of the brisket rail of the present invention depicting certain angles defined thereby.

The segments 32 and 34 differ in several respects. First, the segments 34 are shorter than the segments 32. The following Table A sets forth the certain dimensional parameters, including length, of the segments 32 and 34, along with first and second preferred ranges for these parameters. As shown in FIGS. 6 and 7, the parameters set forth in Table A include: lengths $L_1$, and $L_2$ measured along forward upper edges 150 and 152 of the segments 32 and 34, respectively; thickness T from the front surface 120 to the rear surface 130 of the segments 32 and 34; width $W_1$ of the first and second slanted surfaces 122 and 124; width $W_2$ of the upper surface 126 and lower surface 128; width $W_3$ of the front surface 120; and width $W_4$ of the rear surface 130.

TABLE A

| Parameter | Preferred Value | First Preferred Range | Second Preferred Range |
| --- | --- | --- | --- |
| $L_1$ | 35" | 16"–35" | 12"–40" |
| $L_2$ | 16" | 14"–18" | 12"–20" |
| T | 5.5" | 4"–6" | 2"–8" |
| $W_1$ | 6.0" | 4"–7" | 3"–9" |
| $W_2$ | 1" | .75"–1.50" | .25"–2" |
| $W_3$ | 3.0" | 2"–4" | 1"–6" |
| $W_4$ | 12.0" | 10"–14" | 7"–16" |

To ensure that a proper overall shape of the brisket rail 28 is obtained, the ends of the segments 32 and 34 must be formed to allow them to be welded at the seams 146 and 148. This means that, with reference to the longitudinal axes of the segments 32 and 34, the ends of these segments are formed at different, but complimentary, angles to allow the formation of the seams 146 and 148.

The angles at which the ends of the segments 32 and 34 are formed are perhaps best shown in reference to a vertical plane represented by a line 154 in FIG. 7. To facilitate assembly of the segments 32 and 34 into the brisket rail 28, the ends of the segments 32 and 34 formed such that, when the segments 32 and 34 are welded together, the ends reside in vertical planes corresponding to the seams 146 and 148.

As shown in FIG. 7, this arrangement results in a number of angles where certain vertical planes intersect the reference plane 154. In particular, vertical planes 156 and 158 coexistent with the rear surfaces 130 of the segments 32 and 34 intersect the reference plane 154 at angles $\alpha_1$ and $\alpha_2$, respectively, while vertical planes 160 and 162 coexistent with the seams 146 and 148 intersect the reference plane at angles $\alpha_3$ and $\alpha_4$, respectively.

Also of note are angles $\alpha_5$ and $\alpha_6$, which are depicted in FIG. 6. These angles $\alpha_5$ and $\alpha_6$ are the angles at which the slanted surfaces 122 and 124 extend with respect to horizontal.

The following Table B sets forth the preferred values of the angles $\alpha_1$, $\alpha_2$, $\alpha_3$, $\alpha_4$, $\alpha_5$, and $\alpha_6$, and first and second preferred ranges for these angles.

TABLE B

| Parameter | Preferred Value | First Preferred Range | Second Preferred Range |
| --- | --- | --- | --- |
| $\alpha_1$ | 44° | 22°–47° | 20°–50° |
| $\alpha_2$ | 18° | 15°–28° | 12°–30° |
| $\alpha_3$ | 72° | 70°–93° | 75°–100° |
| $\alpha_4$ | 82° | 80°–93° | 75°–100° |
| $\alpha_5$ | 45° | 42°–48° | 40°–50° |
| $\alpha_6$ | 45° | 42°–48° | 40°–50° |

From Table B, one can derive the preferred dimensions of the segments 32 and 34 before they are assembled together to form the brisket rail 28.

The material from which the segments 32 and 34 is made is preferably ten gauge stainless steel that is cold formed to obtain the desired structure described above. Suitable alternatives to ten-gauge stainless steel are stainless steel in the range of 8 to 12 gauge and mild steel of an equivalent gauge.

The structural assembly 24 described above should be of sufficient strength to bear the loads of created thereon during use. For example, the posts 50 may be four-inch pipe columns. The overhead arms may be made of two and three-eighth inch pipes strengthened by a two-inch flange portion 52c. While the structural assembly 24 is particularly suited for its intended use, one of ordinary skill in the art will recognize how to make and use a suitable structural assembly.

The rump rail 30 is formed of upper and lower continuous pipe members 164 and 166 attached to the distal portions 52b of the overhead arms 52. Extending between these pipe members 164 and 166 is a rump plate 168 made of one or more sheets of stainless steel. The distal portions 52 of the overhead arms 52 and the pipe members 164 and 166 are arranged such that the rump plate 168 is rearwardly canted at an angle of approximately fifteen degrees.

From the foregoing, it should be clear that the present invention may be manufactured in forms other than the preferred form described above.

We claim:

1. A milking parlor system for arranging and confining cows during milking, comprising:
    a rump rail adapted to engage a rear portion of the cows during milking;
    a brisket rail adapted to engage a brisket portion of the cows during milking, where the brisket rail comprises a plurality of discrete, hollow segments formed from sheet metal and joined together at angles to define brisket areas such that the brisket rail engages the brisket portion of the cows in a manner that facilitates arrangement and maintenance of the cows in a conventional herringbone pattern during milking; and
    a structural system for supporting the rump rail at a predetermined location and supporting the brisket rail in a manner that allows the brisket rail to be moved relative to the rump rail; wherein
        each of the discrete segments is formed from a single sheet of material that is bent and welded along a back seam such that the discrete segments are hollow members having open ends.

2. A milking parlor system as recited in claim 1, in which the discrete segments include a long segment type and a short segment type.

3. A milking parlor system as recited in claim 2, in which ends of adjacent discrete segments are formed at complimentary angles.

4. A milking parlor system as recited in claim 2, in which the brisket rail is generally parallel to a reference plane.

5. A milking parlor system as recited in claim 4, in which the open ends of adjacent discrete segments are welded together in vertical planes that extend at first and second sewn angles relative to the reference plane.

6. A milking parlor system as recited in claim 5, in which the discrete segments of the long segment type extend at a first segment angle relative to the reference plane and the discrete segments of the short segment type extend at a second segment angle relative to the reference plane.

7. A milking parlor system as recited in claim 6, in which the first seam angle is approximately between 70 and 93 degrees, the second seam angle is approximately between 80 and 93 degrees, the first segment angle is approximately between 22 and 47 degrees, and the second segmet angle is approximately between 15 and 28 degrees.

8. A milking parlor system as recited in claim 4, in which the discrete segments of the long segment type extend at a first angle relative to the reference plane and the discrete segments of the short segment type extend at a second angle relative to the reference plane.

9. A milking parlor system as recited in claim 1, in which ends of adjacent discrete segments are formed at complimentary angles.

10. A method of arranging and confining cows during milking, comprising:
    providing a rump rail adapted to engage a rear portion of the cows during milking;
    forming a plurality of discrete, hollow segments from sheet metal by bending a single sheet of material; and welding the single sheet of material along a back seam such that the discrete segments are hollow members having open ends;
    joining the discrete, hollow segments at angles to form a brisket rail having brisket areas, where the brisket rail engages a brisket portion of the cows in a manner that facilitates arrangement and maintenance of the cows in a conventional herringbone pattern during milking;
    supporting the rump rail at a predetermined location; and
    supporting the brisket rail in a manner that allows the brisket rail to be moved relative to the rump rail.

11. A method as recited in claim 10, further comprising the step of forming the discrete segments such that ends of adjacent discrete segments are joined at complimentary angles.

12. A method as recited in claim 10, further comprising the step of welding the discrete sections together in vertical planes that extend at first and second seam angles relative to a reference plane.

13. A method as recited in claim 10, in which the step of forming the discrete sections comprises the steps of:
    forming the discrete segments of first and second discrete segment types; and
    joining the discrete segments together such that discrete segments of the first segment type extend at a first angle relative to the reference plane and discrete segments of the second segment type extend at a second angle relative to the reference plane.

14. A milking parlor system for arranging and confining cows during milking, comprising:
    a rump rail adapted to engage a rear portion of the cows during milking;
    a brisket rail adapted to engage a brisket portion of the cows during milking, where the brisket rail comprises a plurality of discrete, hollow segments of first and second segment types and the discrete segments are joined together at angles in an alternating pattern of first and second segment types to define brisket areas such that the brisket rail engages the brisket portion of the cows in a manner that facilitates arrangement and maintenance of the cows in a conventional herringbone pattern during milking; and a structural system for supporting the rump rail at a predetermined location and supporting the brisket rail in a manner that allows the brisket rail to be moved relative to the rump rail; wherein the first segment angle is approximately between 22 and 47 degrees and the second segment angle is approximately between 15 and 28 degrees.

15. A milking parlor system as recited in claim 14, in which ends of adjacent discrete segments are formed at complimentary angles.

16. A milking parlor system as recited in claim 14, in which the discrete segments of the first segment type extend at a first angle relative to the reference plane and the discrete segments of the second segment type extend at a second angle relative to the reference plane.

17. A method of arranging and confining cows during milking, comprising:

providing a rump rail adapted to engage a rear portion of the cows during milking;

forming a plurality of discrete, hollow segments from sheet metal;

joining the discrete, hollow segments at angles to form a brisket rail having brisket areas, where the brisket rail engages a brisket portion of the cows in a manner that facilitates arrangement and maintenance of the cows in a conventional herringbone pattern during milking;

supporting the rump rail at a predetermined location;

supporting the brisket rail in a manner that allows the brisket rail to be moved relative to the rump rail; and welding the discrete sections together in vertical planes that extend at first and second seam angles relative to a reference plane.

18. A method as recited in claim 17, further comprising the step of forming the discrete segments such that ends of adjacent discrete segments are joined at complimentary angles.

19. A method as recited in claim 17, the step of forming the discrete segments comprises the steps of:

bending a single sheet of material; and welding the single sheet of material along a back seam such that the discrete segments are hollow members having open ends.

20. A method as recited in claim 17, in which the step of forming the discrete sections comprises the steps of:

forming the discrete segments of first and second discrete segment types; and joining the discrete segments together such that discrete segments of the first segment type extend at a first angle relative to the reference plane and discrete segments of the first segment type extend at a second angle relative to the reference plane.

* * * * *